United States Patent [19]
Manning

[11] Patent Number: 5,949,544
[45] Date of Patent: Sep. 7, 1999

[54] METHODS AND APPARATUS FOR PERFORMING VERY RAPID SCAN SPECTROMETRY USING A BALANCED MIRROR ASSEMBLY DRIVEN AT THE RESONANCE FREQUENCY

[76] Inventor: Christopher J. Manning, 502 S. Blaine St., Moscow, Id. 83843

[21] Appl. No.: 09/115,211

[22] Filed: Jul. 14, 1998

Related U.S. Application Data

[60] Provisional application No. 60/052,488, Jul. 14, 1997.

[51] Int. Cl.[6] .................................................... G01B 9/02
[52] U.S. Cl. .......................... 356/346; 359/199; 359/872
[58] Field of Search .................................. 356/346, 358; 359/197, 198, 199, 871, 872

[56] References Cited

U.S. PATENT DOCUMENTS

| | | | |
|---|---|---|---|
| 1,756,232 | 4/1930 | Arnaud | 359/199 |
| 1,951,666 | 3/1934 | Martin | 359/199 |
| 5,486,917 | 1/1996 | Carangelo et al. | 356/346 |
| 5,565,052 | 10/1996 | Papenburg et al. | 156/155 |
| 5,825,493 | 10/1998 | McGlynn | 356/346 |

*Primary Examiner*—Samuel A. Turner
*Attorney, Agent, or Firm*—Mintz, Levin, Cohn, Ferris, Glovsky and Popeo, P.C.

[57] ABSTRACT

A spectrometer includes an actuator assembly, a mobile mirror assembly responsive to the actuator assembly, a balancing element responsive to the mobile mirror assembly, and a suspension mechanism operatively connected between the mobile mirror assembly, the balancing element and an optical support element in a relative position that isolates substantially all forces arising out of the actuation by the actuator assembly of the mobile mirror assembly and the balancing element.

21 Claims, 12 Drawing Sheets

5,949,544

METHODS AND APPARATUS FOR PERFORMING VERY RAPID SCAN SPECTROMETRY USING A BALANCED MIRROR ASSEMBLY DRIVEN AT THE RESONANCE FREQUENCY

CROSS-REFERENCE TO RELATED APPLICATIONS

This application claims the benefit of provisional application Ser. No. 60/052,488, filed Jul. 14, 1997, herein incorporated by reference, and having the same title as the present application.

FIELD OF THE INVENTION

This invention relates to methods and devices for very rapid scan interferometry.

BACKGROUND OF THE INVENTION

The conventional approach to scanning an interferometer mirror involves linear translation of a plane mirror, typically driven by a solenoid linear motor. Because of the limitations of magnetic field strength and current which can be practically achieved, such systems are usually limited to rates below 100 scans per second.

SUMMARY OF THE INVENTION

Several aspects of the invention are presented in this application. These relate to improvements including improvements to spectrometers, mirrors, and related methods.

In one general aspect, the invention features a spectrometer includes an actuator assembly, a mobile mirror assembly responsive to the actuator assembly, a balancing element responsive to the mobile mirror assembly, and a suspension mechanism operatively connected between the mobile mirror assembly, the balancing element and an optical support element in a relative position that isolates substantially all forces arising out of the actuation by the actuator assembly of the mobile mirror assembly and the balancing element. Further aspects of the invention are also presented.

It is an objective of the present invention to rapidly and controllably vary the path difference of an interferometer, especially in a Fourier Transform - Infrared (FT-IR) spectrometer. It is also an objective of the present invention to measure spectra, and multiple spectra, rapidly. It is also an objective of the present invention to measure one or more spectra rapidly with relatively high resolution. It is also an objective of the present invention to measure complete spectra faster than possible with most present spectrometers and especially FT-IR spectrometers. It is also an objective of the present invention to scan interferometer retardation rapidly for purposes, other than spectrometry, such as metrology and optical correlation. Further related objectives will also become apparent to one of skill in the art from the various parts of this document.

Methods and devices for very efficiently and rapidly driving interferometer motion are described. Two important advantages of these drive mechanisms are that they can be lightweight and they not impart significant reaction forces to other optical components (i.e., they are reactively balanced or substantially reactively balanced with respect to those components). Also described are variations of a Michelson interferometer design which are particularly suited to rapid and efficient drive.

By the use of the drive mechanisms and optical geometries described herein, scan-rate limitations can be obviated. The designs described below may be suitable for measuring 1000 interferograms per second and beyond. The designs described here may also be also appropriate for the construction of compact, lightweight interferometers, with low power consumption, suitable for airborne and space-flight applications.

BRIEF DESCRIPTION OF THE DRAWINGS

FIG. 2B is a cross-section of the mirror assembly of FIG. 2a;

FIG. 3B is a perspective diagram of mechanical components of the drive mechanism of FIG. 3a;

DETAILED DESCRIPTION OF AN ILLUSTRATIVE EMBODIMENT

Figure 1:
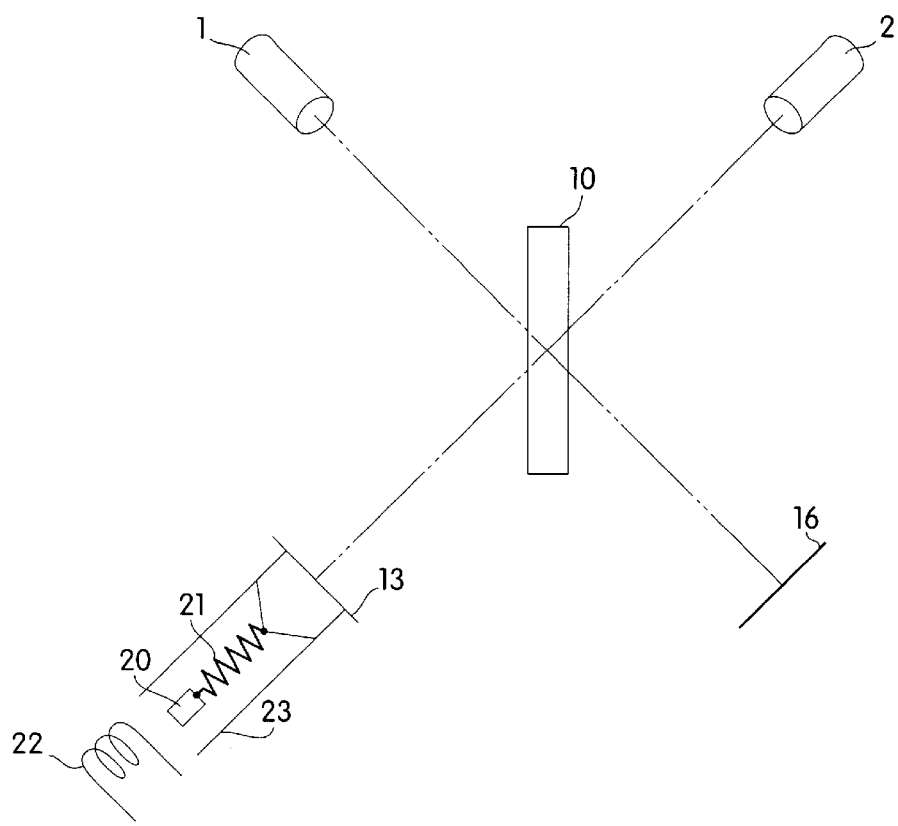
FIG. 1 is an optical diagram of a Michelson interferometer according to the invention employing a reactive drive mechanism.

Referring to the attached FIG. 1, energy from a source 1 travels to a detector 2. The source and detector symbolically illustrated in FIG. 1 may be known components and, as such, need not be described in detail. Reference is made to Chemical Fourier Transform Infrared Spectrometry by Griffiths and de Haseth, Wiley-Interscience, ISBN 0-471-09902-3, which describes the prior art in great detail.

Figure 2A:
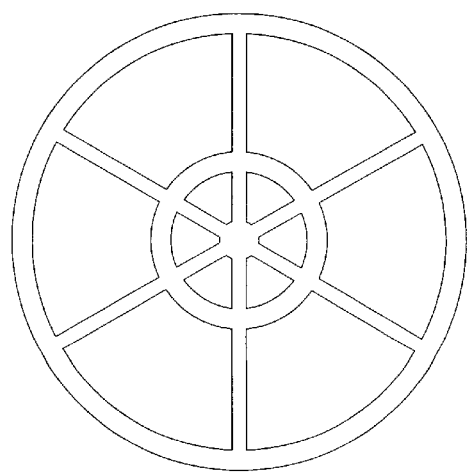
FIG. 2A is a bottom plan view of a moving mirror assembly for the Michelson interferometer of FIG. 1.

Radiation from a source 1 is collimated, generally by a parabolic mirror, and propagates to a beamsplitter 10. The beamsplitter 10 divides the source beam into reflected and transmitted beams. One of these two beams, in this case the one transmitted, propagates to a flat mirror 16, which is oriented perpendicular to the plane of propagation. This beam is reflected back to the beamsplitter 10. This arrangement forms the fixed arm of a Michelson interferometer. However, this arrangement can be replaced by the same elements that form the variable pathlength arm (described below) to double the total path difference and the rate of change of path difference. The beam initially reflected from the beamsplitter reaches flat mirror 13 which is supported by the components 20, 21 and 23 that form a reaction drive mechanism. The beams reflected from mirrors 13 and 16 return to the beamsplitter 10 and are recombined and pass on to the detector 2. The detector signal is processed according to known methods. The mirror 13 can be constructed of a lightweight material, preferably beryllium or carbon-fiber composite, having a stiff lightweight structure as indicated by FIG. 2. The support tube can be a stiff, lightweight material such as a carbon-fiber composite.

The approach illustrated in FIG. 1 uses a mass 20 supported by a spring 21 at the end of a support tube 23 opposite to which the mirror 13 is attached. The mass 20 may be a high-field magnet such as one made of neodymium-iron-boron or another suitable ferromagnetic material such that the system may be driven by a solenoid coil 22. Because the reaction force of the mirror acceleration is felt by the mass 20, and vice versa, the optical bench, or other optical reference element, remains free from vibration to the extent that the suspension system for the support tube 23 is decoupled from the optical bench in the axis of motion. The mass 20 can be nearly equal to the combined mass of the mirror 13 and support tube 23 so that the center of mass does not change during the vibrational cycle. The system of the two masses and the spring will have a natural resonant frequency governed by the reduced mass, m, and spring constant, k. The frequency is given by $f=SQRT(k/m)/(2*PI)$. If the solenoid coil 22 is energized with an AC current oscillating at the resonant frequency of the system, the mechanical oscillation will be driven to large amplitudes suitable for medium resolution scanning.

The midpoint of the spring, which does not move, may be anchored to the optical bench. This approach is closely related to alternative implementations which provide a counterweight to balance the motion of the mirror, but have both the mirror and the counterweight connected separately to an optical bench or chassis. By counterbalancing the reaction force of the mirror motion at the optical bench the same net effect described relative to FIGS. 1 and 3 is achieved. Other implementations can include a crankshaft/connecting rod drive of the type used in reciprocating engines, together with a counterweight on a separate connecting rod (see FIG. 11 and accompanying text).

Figure 2B:
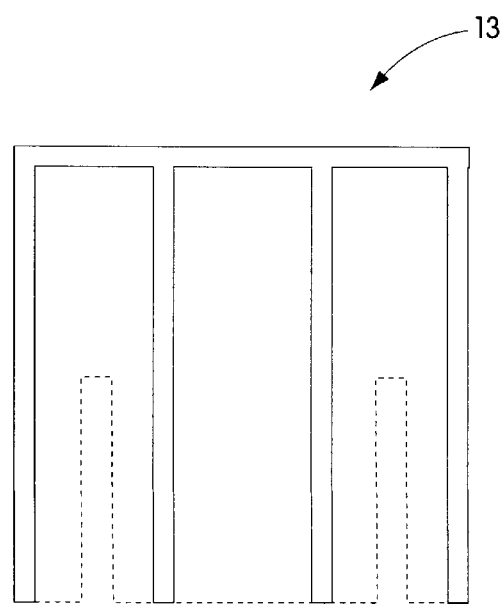
Figure 3A:
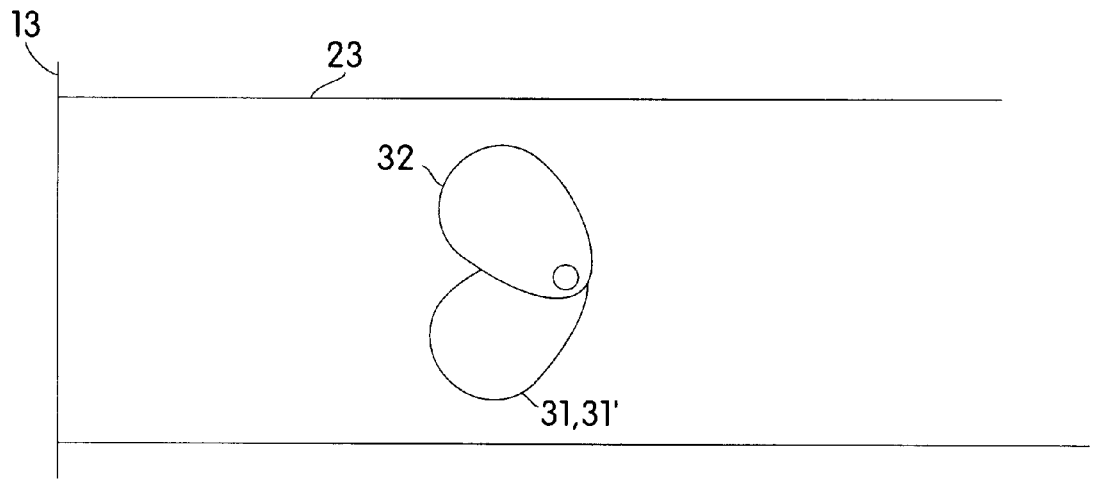
FIG. 3A is a cross-section of a portion of an interferometer similar to the one shown in FIG. 1 with an alternative reaction drive mechanism.
Figure 3B:
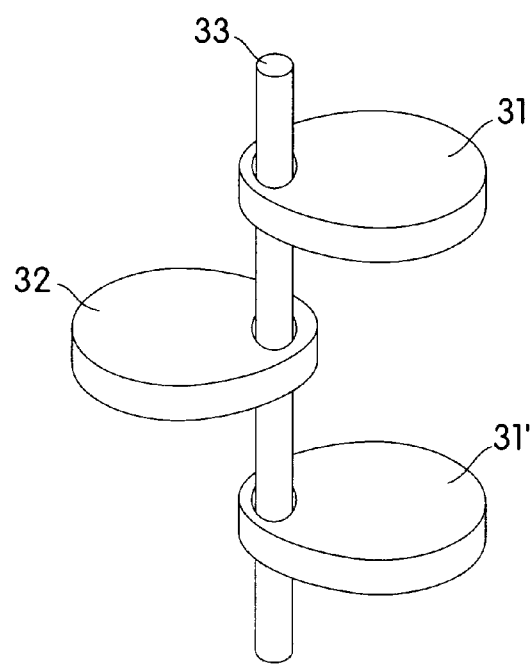

A second reaction drive method and device is illustrated in FIGS. 3A and 3B. It uses rotating counterweights to achieve the same effect as the spring-mass system of FIG. 1. Three counterweights 31, 31' and 32 are mounted on a common pivot 33 such that they can rotate in opposite directions. If the masses rotate exactly in phase but in opposite directions, then the pivot will experience an oscillating reaction force only in the axis of desired mirror motion. The reaction forces will cancel in the axis perpendicular to the axis of motion (of the mirror). The pivot 33 can be attached securely to the support tube 23 such that the reaction force is coupled to the overall assembly. The rotation of the weights can be driven with a solenoid 22 as described relative to FIG. 1. The masses 31, 31' and 32 can be arranged such that there is not an oscillating torque on the tube 23. This can be done by separating 31 and 31', as shown in FIG. 2b, symmetrically above and below 32 so that the moments of 31 and 31' cancel. The sum of the masses 31 and 31' can equal the mass of 32.

The use of linear translating mechanisms to illustrate the reaction drive invention should not be construed to limit the concept. A series of analogous designs readily utilize torsion springs together with reciprocally rotating counterweights. Such designs may be particularly suited to use with the interferometer variation illustrated in FIG. 8.

Many different methods of suspension of the reaction drive mechanism may be utilized. A particularly economical and efficient example is provided by Lacey in U.S. Pat. No. 4,710,001. Lacey describes the use of flat springs made from sheet metal as supports for an interferometer mirror. An advantage of such springs in regard to the present invention is the very low inertia they provide. A variety of other low-inertia supports may be envisioned, including small diameter, lightweight ball bearings, air bearings and fluid bearings, which allow free translation in one axis while being very stiff in the other two axes of translation and in all three axes of rotation. Another suitable arrangement is the well-known "porch swing" design (see Griffiths and de Haseth, p. 133). It is appropriate to use stiff, lightweight materials such as carbon-fiber composite for the support components in this design.

The principles in this application can be applied to different types of spectrometry, including interferometry, as well as other types of optical instruments. For the purposes of this application, spectrometry includes all applications of interferometry, including metrology and other fringe-counting methods.

Figure 4A:
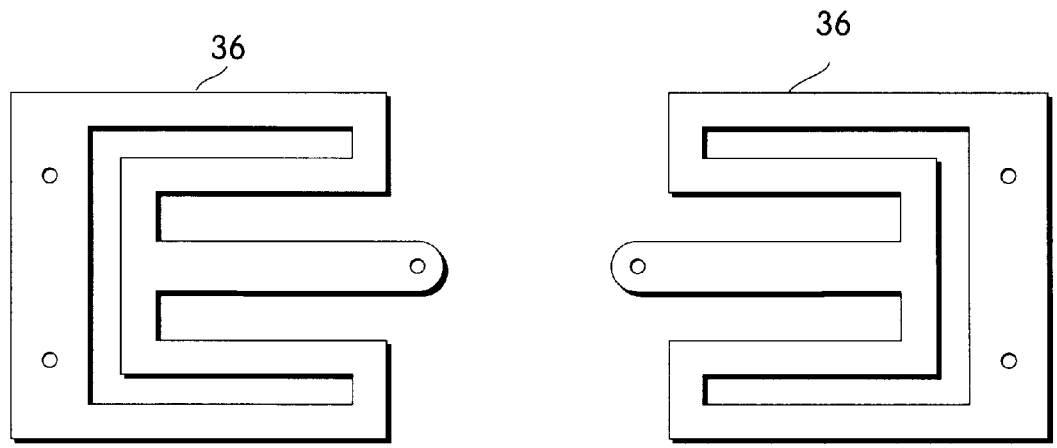
FIG. 4A is a plan view of a suspension spring for the interferometer of FIG. 1.
Figure 4B:
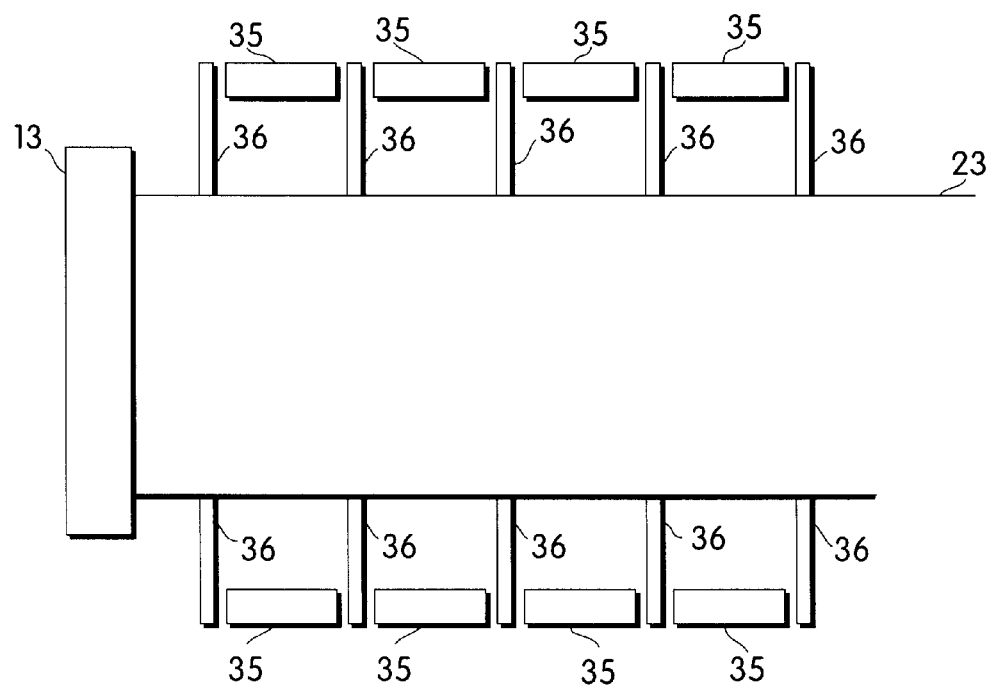
FIG. 4B is a cross-section of a stacked arrangement of springs similar to the one shown in FIG. 4a for use in a suspension mechanism for the interferometer of FIG. 1.

FIG. 4A shows a sheet metal spring, of the general type described by Lacey, which is very rigid in the two axes orthogonal to the desired direction of motion (which is a normal line coming out of the page). In ordinary use, a series of such springs 36 would be arranged in stacks along the sides of the mirror support tube 23 to constrain its motion to a single axis of translation. Such an arrangement is diagrammed in FIG. 4B. The springs are supported by spacers 35. Two rows of springs 36 and spacers 35 are set up on opposite sides of the tube 23. Another two rows may be used to further constrain the motion in the orthogonal axis. The springs 36 provide a moderate restoring force suitable for maintaining the average mirror position near the correct point. It may be appropriate to evacuate the air from this interferometer design to reduce frictional and acoustic losses at higher scan speeds. With energy losses so eliminated these drive mechanisms can be extremely efficient, unlike voice coil drive mechanisms. The efficiency can result from recycling the kinetic energy of motion of the mirror and counterweights. A voice coil drive mechanism generally has to couple the energy of translation in the mirror for both directions of each cycle. In principle this energy could be recycled electronically, but coil resistance drastically limits the efficiency of such an arrangement. Superconducting coils could therefore be used in such an embodiment to allow efficient recovery and recycling of energy. The cooling system used for the superconducting magnet could be shared with a cooled interferometer and/or detector.

Figure 5:
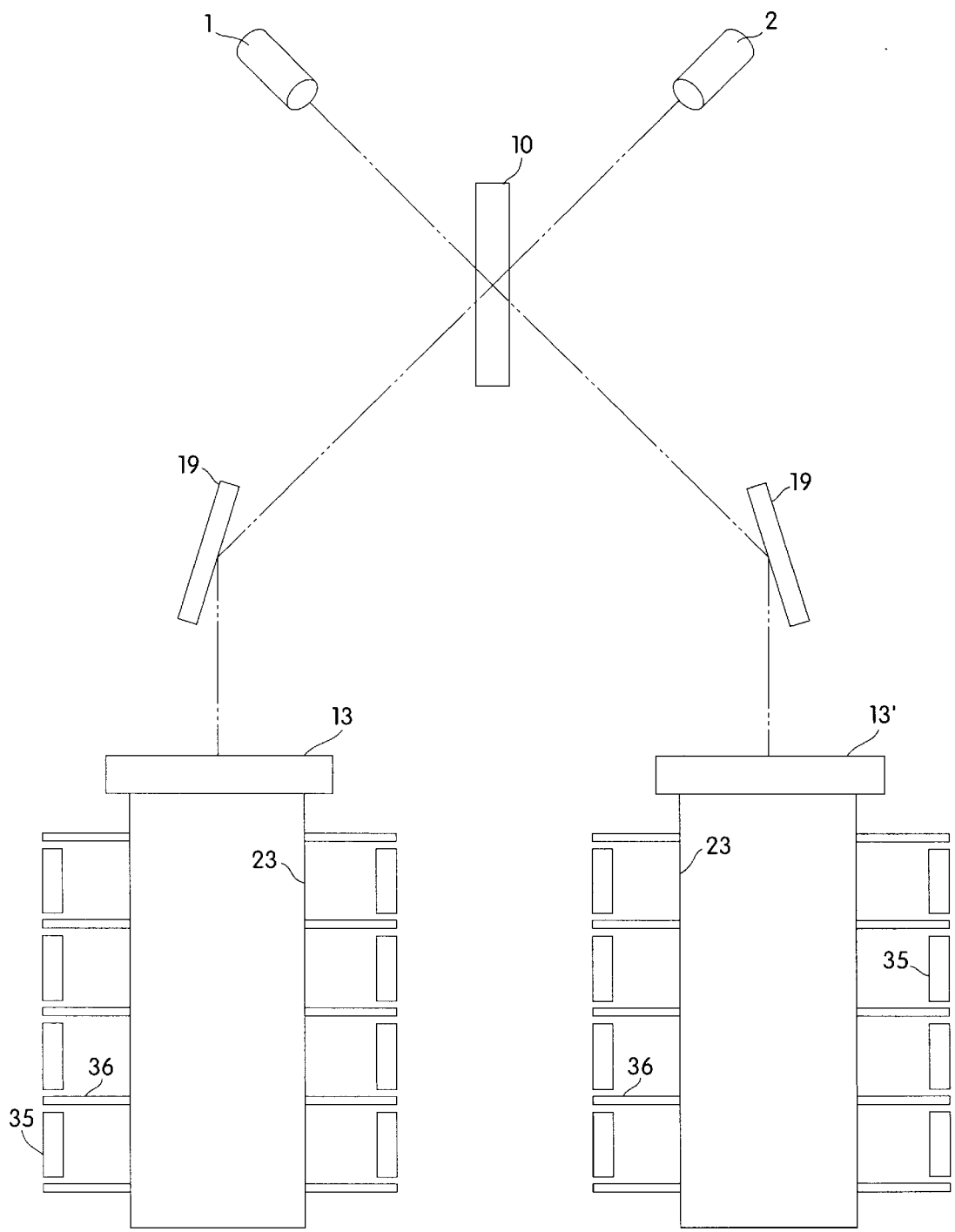
FIG. 5 is an optical diagram of a Michelson interferometer according to the invention in which mirrors in both arms are driven.

One of the applications, diagrammed in FIG. 5, of the reaction drive mechanism is the construction of a Michelson interferometer in which the mirrors in both arms are driven. One such arrangement places the axes of motion of the two mirrors in parallel. This involves the use of folding mirrors 19 to bring the beams from 90 degree divergence to parallel. Any disturbance (vibration) felt by one mirror (13 or 13') will also be felt by the other (13' or 13) such that the effects in the two arms cancel thereby rendering the design relatively immune to external disturbances. This arrangement also allows the force applied to mirrors to be reduced by 50% (for a given resolution, relative to a design having only one driven mirror). There is a slight susceptibility to torsional forces acting in the plane defined by the two linear scan axes.

Figure 6:
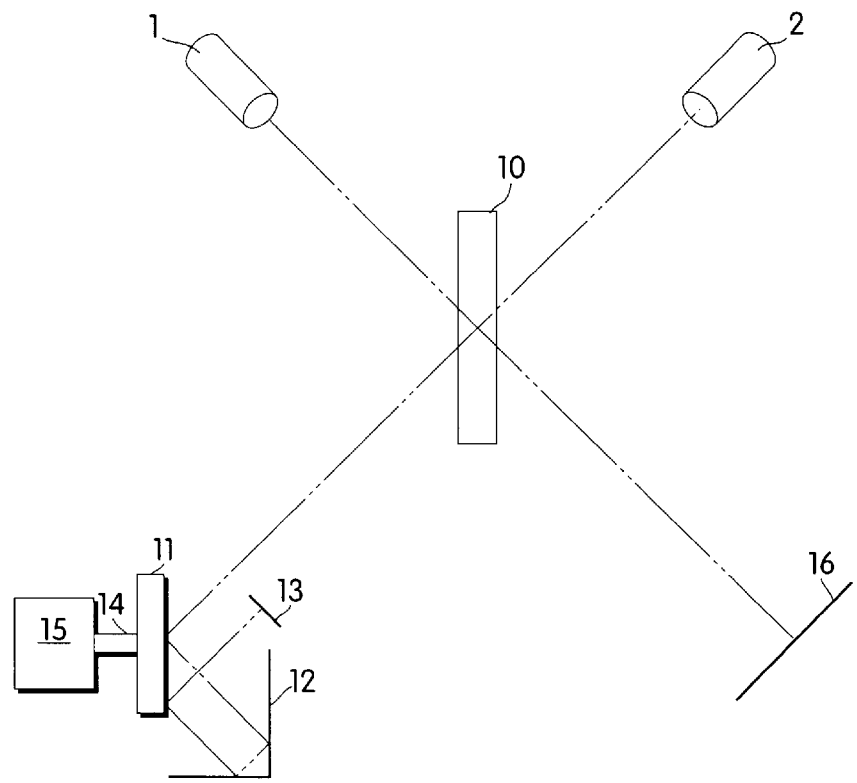
FIG. 6 is an optical diagram of a Michelson interferometer employing a corner cube retroreflector located near a rotating disk mirror to cancel angular variations.
Figure 7:
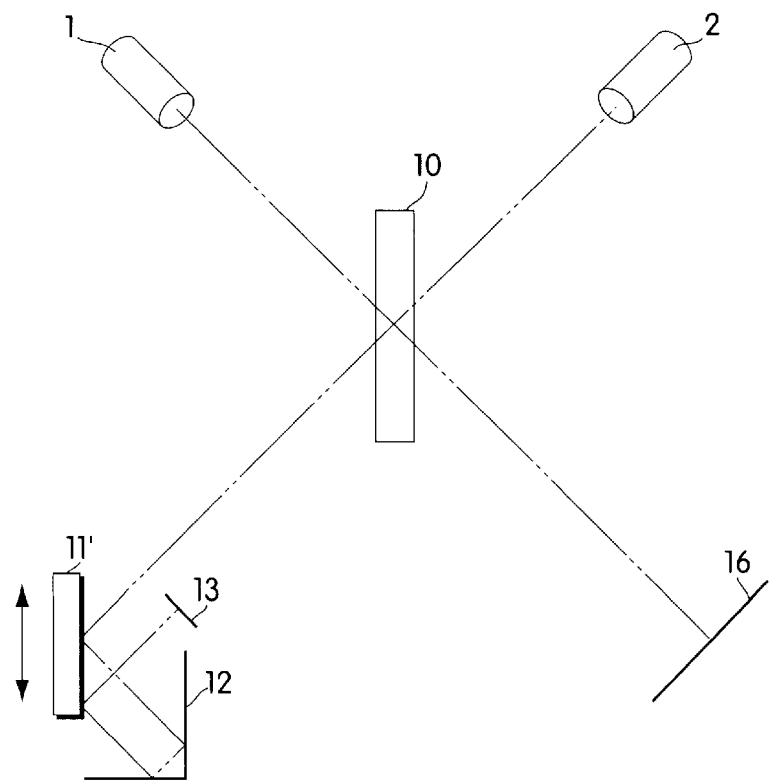
FIG. 7 is an optical diagram of a Michelson interferometer including a corner cube retroreflector near a sliding plane mirror.

Michelson interferometer variations will now be described. With reference to FIG. 6, the fundamental concept of an interferometer design described in provisional disclosure 60/029,364 and related application Ser. No. 08/959,030 filed under the name of the inventor of this application, and herein incorporated by reference, is the use of complementary reflections from a single plane mirror to cancel the angular variation, caused by tilt or precession, of a beam reflecting from that surface. In the illustrating example, reproduced here as FIG. 6, the single plane mirror was a rotating disk. As before, radiation from a source 1 is divided by a beamsplitter 10. The transmitted beam passes to flat mirror 16 which is aligned exactly perpendicular to the direction of propagation. This forms the fixed arm of a Michelson interferometer. The beam reflected from the beamsplitter 10 passes to the plane mirror 11 and is reflected to the corner cube retroreflector 12. Upon return from the retroreflector 12 the beam is offset sufficiently to clear the original incident beam on the plane mirror 11 such that after a second reflection from the plane mirror 11, the beam may reach a flat mirror 13 oriented perpendicular to the direction of propagation. The two beams returning to the beamsplitter from mirrors 13 and 16 are recombined at the beamsplitter and pass on to the detector 2. The rotation of the disk mirror 11 to effect precession is driven by a motor 15 via a shaft 14. Important variations disclosed herein are the use of a sliding plane mirror (FIG. 7), a tilting plane mirror and a translating plane mirror in place of the precessing disk mirror. A modification with a polarizer and eighth-wave plate may allow a more compact design which may be suited to metrology and optical correlation.

The sliding plane mirror arrangement shown in FIG. 6 has the advantage of multiplying the effect of mirror translation by the factor 0.25×sin(wedge angle), making precise or slow variation of path difference more convenient. The theory of operation of this arrangement follows the discussion of FIG. 6, with the exception that the wedged plane mirror 11' does not precess, but rather slides in the axis indicated. By using a good linear bearing (such as an air bearing) and small wedge angles, precise or slow variation of path difference is made convenient.

Figure 8:
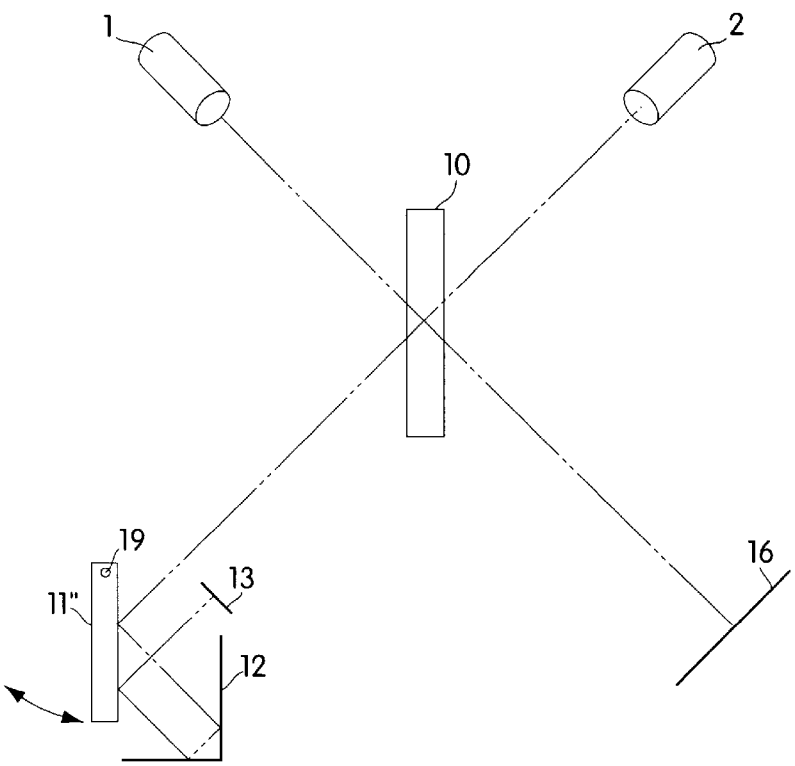
FIG. 8 is an optical diagram of a Michelson interferometer including a corner cube retroreflector near a tilting mirror.

An alternative use of this general optical design is a tilt interferometer shown in FIG. 8 in which the mirror 11" may be simply flat but pivoted about a point 19, to provide arcuate motion, such that the beam optical path varies with the degree of rotation. By moving the pivot 19 close to the point where the beams impinge on the tilt mirror 11" the variation of optical path difference with rotation angle can be made quite small thereby allowing for less critical control. As before, an identical arrangement of the components 11", 12 and 13 can be placed in the second arm of the interferometer such that the effects of external disturbances are greatly reduced. By balancing the mass about the pivot point 19, susceptibility to linear vibrations is minimized. If a completely separate second tilt mirror 11" is used in the second arm, equal torsional responses in the two arms may be used to cancel the effects of torsional disturbances. Another variation may utilize a mirror formed on the reverse side of mirror 11"0 to form the second arm, but this design could remain susceptible to torsional disturbances in the axis of the pivot 19.

Figure 9:
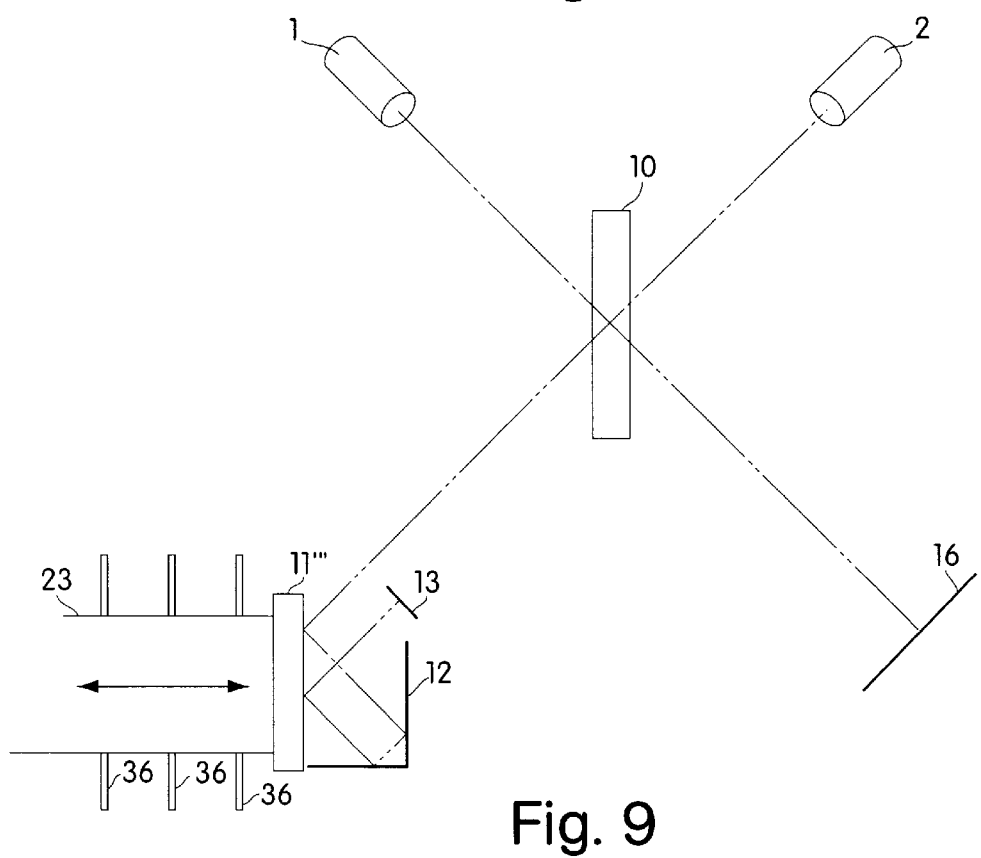
FIG. 9 is an optical diagram of a Michelson interferometer including a corner cube retroreflector near a translating plane mirror.

A third variation, illustrated in FIG. 9, of this optical design produces a tilt and shear compensated interferometer similar to Steel's design (see Griffiths and de Haseth, p. 145), but allows for the use of a plane mirror as the translating element, rather than the corner cube element. Plane mirrors are generally lighter and less expensive to fabricate than corner cube reflectors. The general theory of operation again follows the discussion relative to FIG. 6 with the exception that the mirror 11''' is translated along an axis roughly perpendicular to the mirror surface. One particularly advantageous combination of this geometry with the reaction drive mechanism allows the use of imperfect bearings or spring supports as described relative to FIG. 4. This is possible because any tilt or shear of the plane mirror 11''' is compensated.

Figure 10:
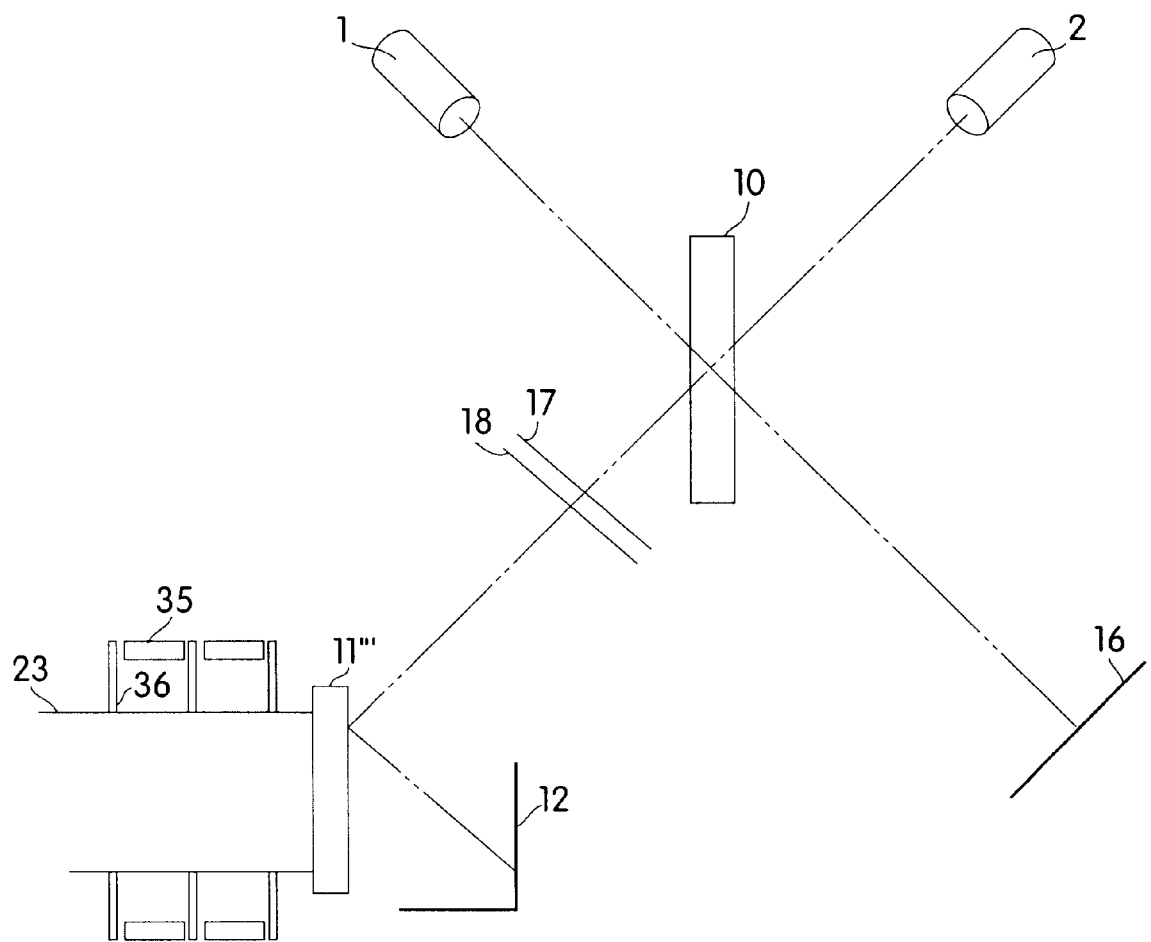
FIG. 10 is an optical diagram of a Michelson interferometer including a corner cube retroreflector near the polarizer and eighth-waved plate.

A proposed fourth variation of this geometry, illustrated in FIG. 10, may use a polarizer 17 and eighth-wave plate 18 to compress the optical layout. In this arrangement the corner cube retroreflector 12 reflects the beam image directly back towards the beamsplitter 10, rather than offsetting as in FIGS. 6 through 9. This eliminates the need for an additional mirror 13. The beam has passed through the eighth-wave plate 18 twice after the polarizer 17 such that it reflects from the polarizer 17 on the first reincidence. This reflection sends it twice more through the eighth-wave plate 18 such that the polarization is brought to a state 180 degrees from the initial state. The 180 degree polarization may pass freely through the polarizer 17 and back to the beamsplitter 10 for recombination and passage on to the detector 2. This design may be particularly suited to interferometric uses, such as metrology and optical correlation, that employ a single wavelength source.

Figure 11:
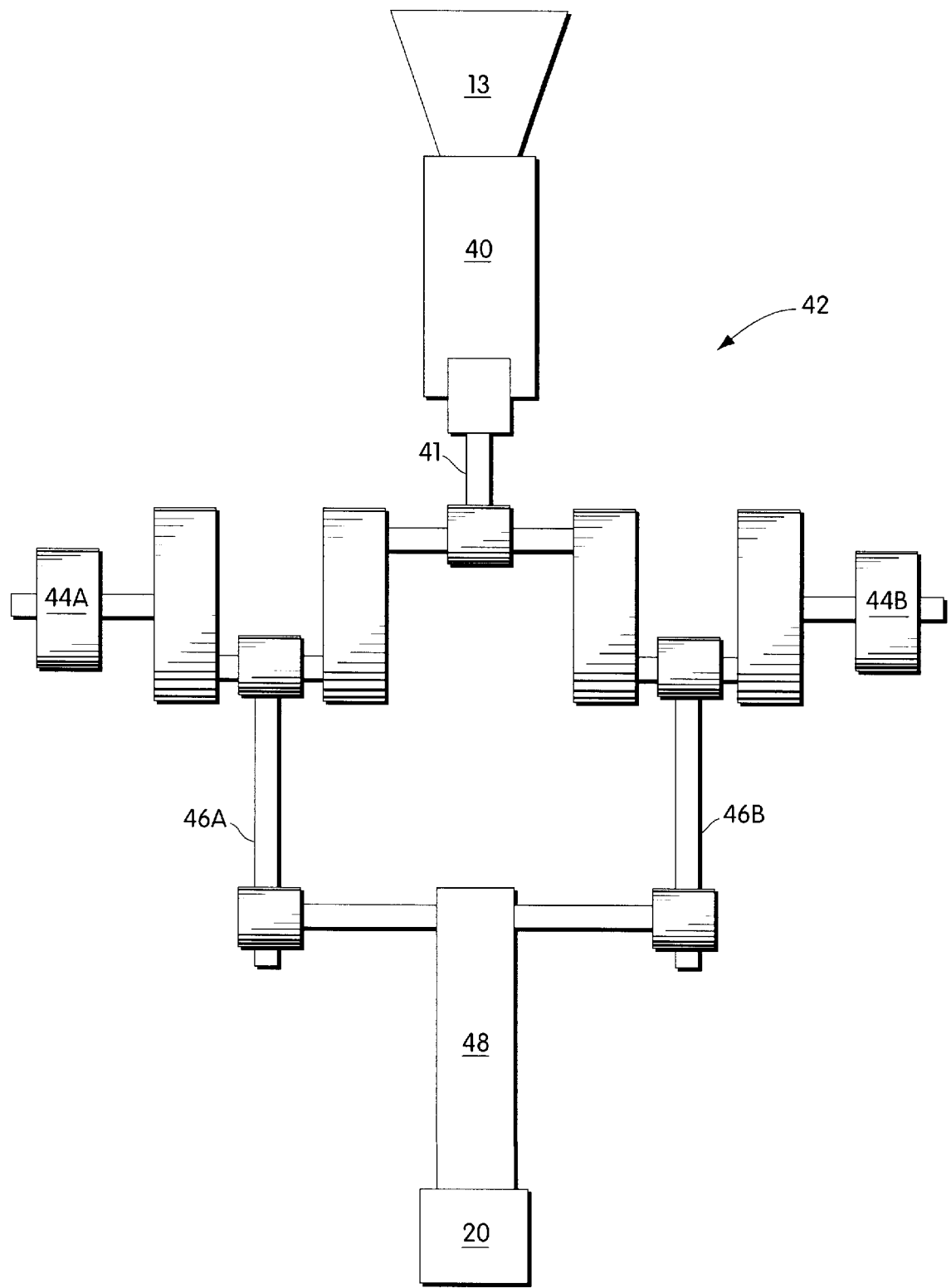
FIG. 11 is a cross-section of an alternative drive mechanism which employs a rotating crankshaft.

Referring to FIG. 11, a crankshaft-based mechanism includes a first reciprocating connecting rod 41 connected via a linear bearing 40 to a mirror 13. A crankshaft 42 is mounted on a pair of bearings 44a, 44b and includes a first offset axle connected to the first connecting rod 41, and two additional offset axles connected to counterweight connecting rods 46a, 46b. These connecting rods are connected to a further axle which drives a primary counterweight connecting rod that is connected to a counterweight 20 by a linear bearing 48.

Figure 12:
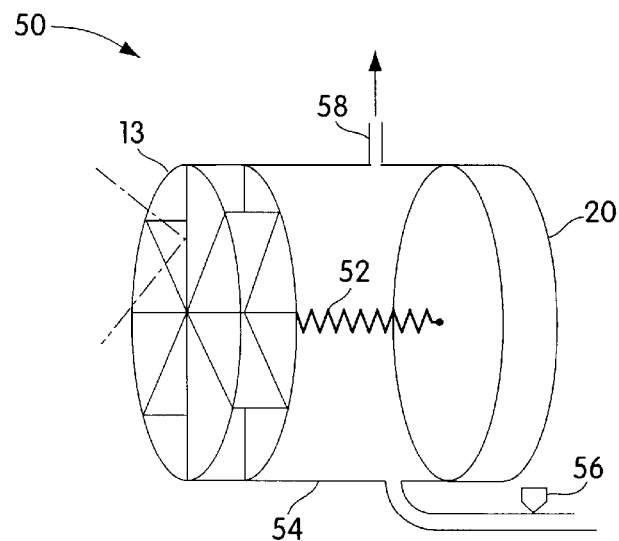
FIG. 12 is a cross-section of a fluid-drive mechanism.

Referring to FIG. 12, a fluid-actuated drive mechanism 50 includes a mirror 13 connected to a counterweight 20 by a spring 52. These are each shaped to act as pistons within a cylinder 54 and define a chamber separating them. This chamber is connected to a source of actuating fluid via a high speed valve 56, as well as to bleed orifice 58. In operation, the high speed valve actuates the mirror and counterweight by introducing a fluid under pressure, such as compressed air or hydraulic fluid into the space. By altering the timing of the valve openings and closings, the motion of the mirror can be controlled very accurately in the presence of large accelerations.

Figure 13:
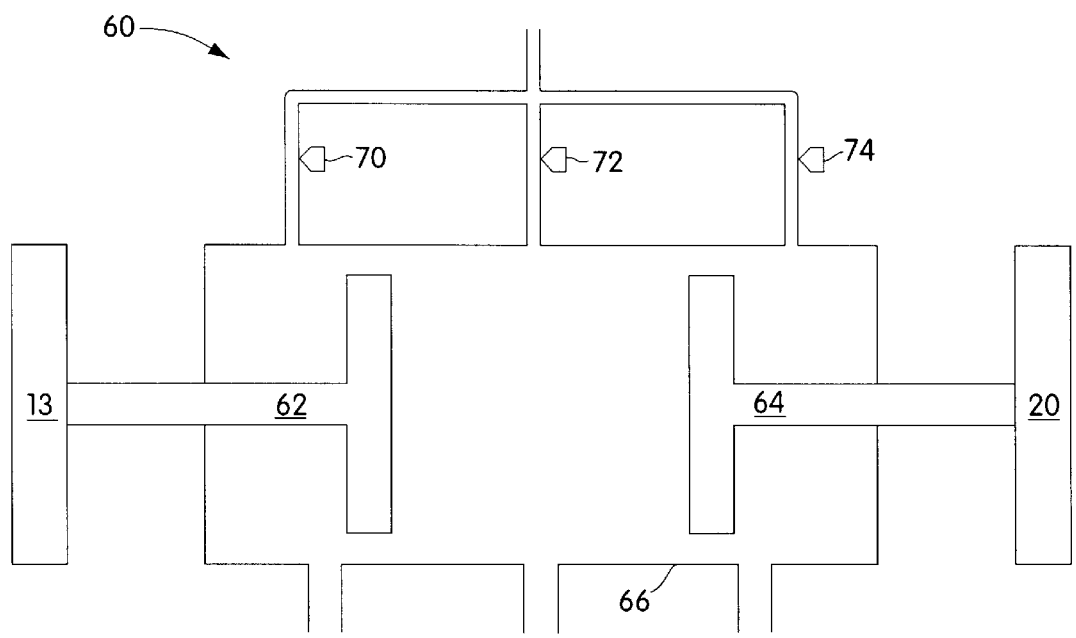
FIG. 13 is a cross-section of an alternative fluid drive mechanism.

Referring to FIG. 13, an alternative fluid-drive mechanism 60 includes a first dual-acting piston 62 connected to a mirror 13 and a second dual-acting piston 64 connected to a counterweight. The two pistons are constructed to move within a sealed cylinder 66 and thus define three chambers—a first, central chamber between the two pistons, a second chamber opposite the central chamber with respect to the first dual-acting piston, and a second chamber opposite the central chamber with respect to the second dual-acting piston. Each of these chambers has its own feed orifice and bleed orifice, and each of the feed orifices is fed via a separate valve 70, 72, 74. This embodiment operates in a manner similar to the one described above in connection with FIG. 12, with the difference that a sequenced application of pressure to the three chambers via the valves drives the mirror and counterweight without the need for a spring. Another embodiment of the reaction-balanced fluid-drive mechanism can employ bleed orifices to regulate pressure resulting from a fixed or variable inflow of fluid. A further embodiment can employ only valves to meter the fluid.

Figure 14A:
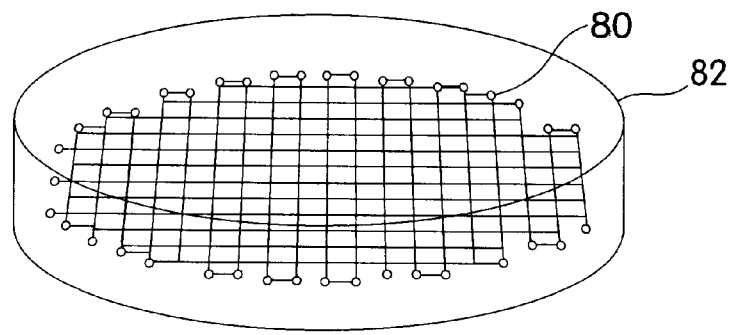
FIG. 14A is a perspective view of a support element for a mirror for a very high-speed Michelson Interferometer.
Figure 14B:
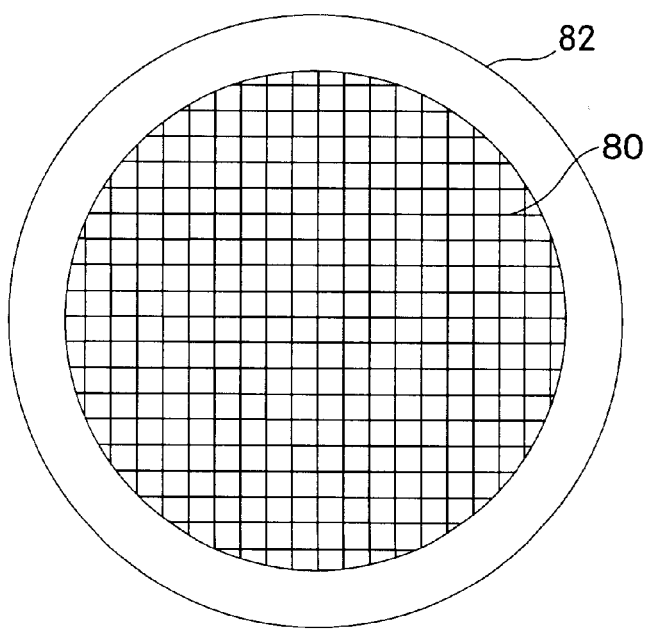
FIG. 14B is a top plan view of the support element of FIG. 14A.

Referring to FIGS. 14A and 14B, a particularly advantageous lightweight mirror suitable for high-speed interferometry uses a woven mesh 80 of fibers or strings to support a mirror surface. The fibers can be supported in tension by a frame 82. To reduce the weight of the mirror the fibers can have a high modulus of elasticity, such as is available from carbon fibers or Kevlar fibers. The frame can be a stiff and lightweight tube or ring, and can provide tension on the web to make it resistant to deformation by inertial forces during acceleration.

A variety of mirror surfaces can be applied to this type of support. The so-called replication technique appears to offer a particularly cost-effective and precise method of forming a mirror surface that is sufficiently flat for the purposes described in this document. Other methods include bonding of thin metal, glass, or other substrate mirrors to the woven support. Because the woven support can be very stiff, a very thin mirror of conventional design may be bonded to it. It may be advantageous to bond the thin mirror to the woven support first, then lap the mirror to its final figure, allowing the final lapping to compensate for any distortion of the mirror substrate caused by bonding.

Although a single-layer weave is shown in FIGS. 14A and 14B, other weaves and configurations are also possible. For example, the support may be further stiffened with a second woven layer, or with fibers or strings that apply tension outside of the plane of the woven layer or layers.

Figure 15A:
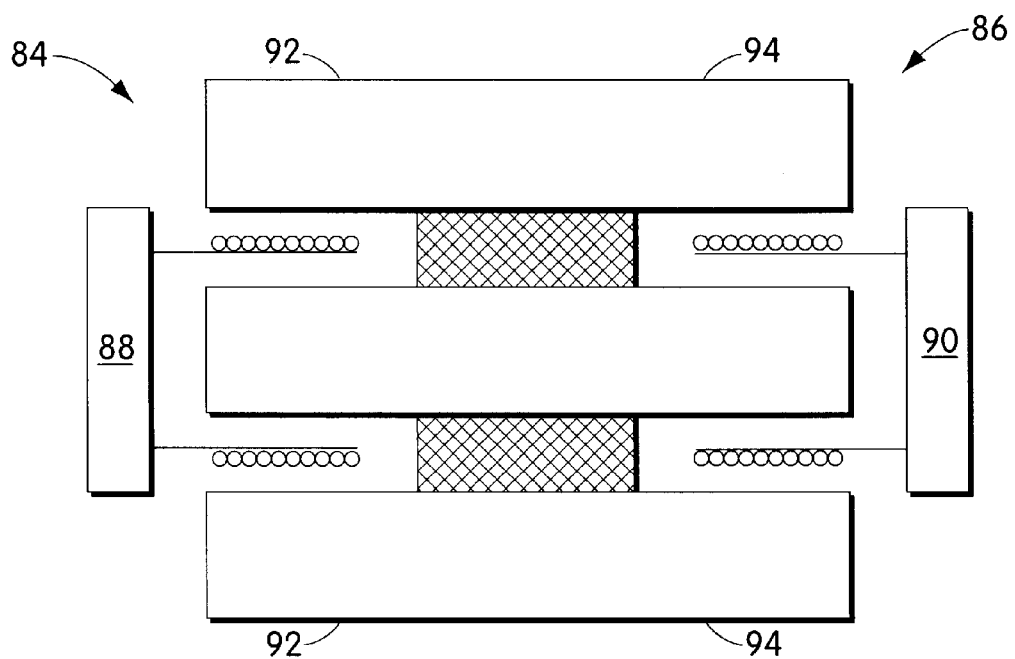
FIG. 15A is a cross section of an alternative drive mechanism employing balanced linear motor elements.
Figure 15B:
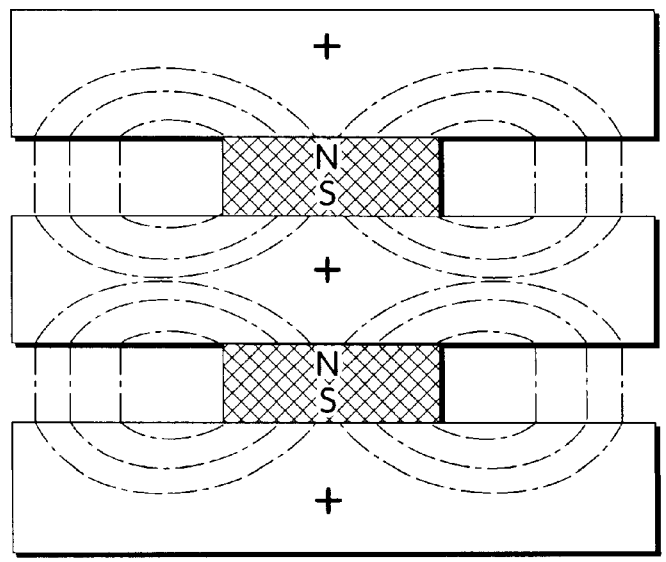
FIG. 15B is a cross section of the stator of the drive mechanism of FIG. 15A illustrating magnetic field lines for a combined stator for the drive mechanism of FIG. 15A.

Referring to FIGS. 15A and 15B, another type of reaction-balanced drive can include two linear motor elements 84, 86, which can each be otherwise conventional voice-coil or speaker magnet solenoid linear motor drive elements. The first linear motor element 84 includes a moving element 88 attached to a mirror and the second linear motor element 90 includes a counterweight. Each of these moving elements interacts with a stator portion 92, 94. The stator portions can be separate elements or be combined into a single element. Moving-coil or moving-magnet designs with permanent-magnet or electromagnet stators can be designed. This embodiment can benefit greatly from use with the lightweight mirror described in connection with FIGS. 14A–14B.

To achieve balance, the two linear motor elements act on the same axis, but in opposite directions. If both moving coils are in the same effective magnetic field, then currents flowing in the coils can produce equal but opposite accelerations in the two moving assemblies, resulting in reaction balance. This arrangement can be readily achieved by arranging the two coils in the same circuit so that the same current flows through them in opposite directions. The masses of the mirror and counterweight need not be equal. It can be sufficient that they experience equal and opposite forces.

Figure 15C:
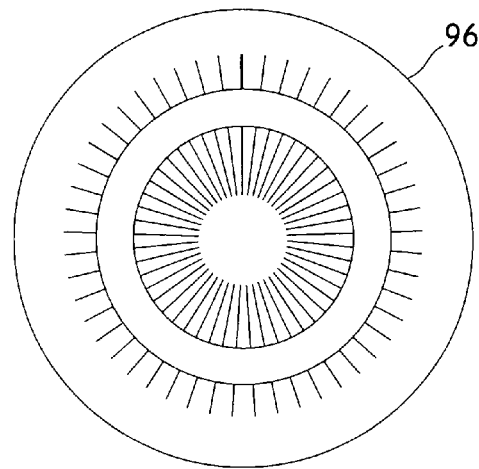
FIG. 15C is an end view of a stator element for use in the drive mechanism of FIG. 15A.

Referring to FIG. 15C, a pole piece 96 of a stator for use with the embodiment described in connection with FIG. 15A can be slotted to reduce eddy currents by interrupting the current path within the pole pieces that such eddy currents would otherwise take. The slots may be arranged radially around the pole piece and run parallel to its longitudinal axis. The known technique of wire EDM can be used to cut the slots. Reducing eddy currents in very-high speed interferometers can be particularly important, because it is important to quickly change field strengths over large amplitudes, and eddy currents tend to increase with frequency. Other ways of preventing eddy currents can include the use of powdered iron, ferrite, or laminated pole pieces, which also interrupt the current path that eddy currents would otherwise take.

Figure 16:
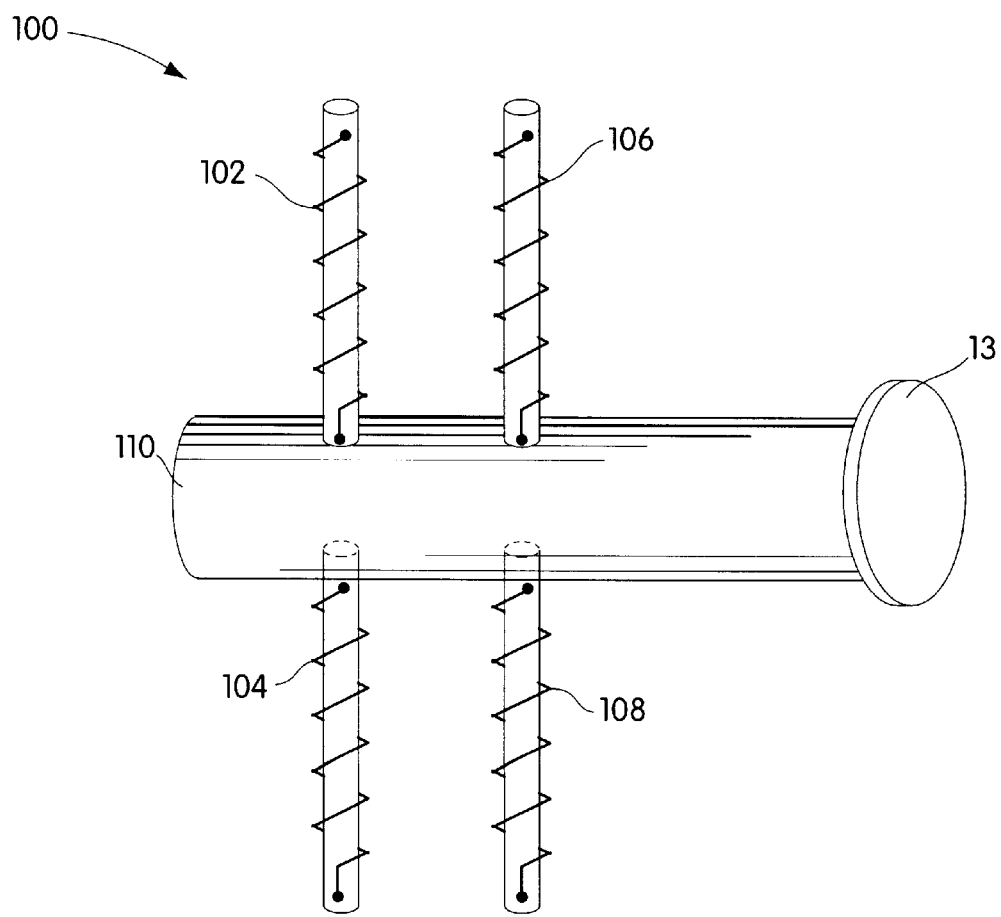
FIG. 16 is a diagram of an alternative, induction-based drive mechanism.

Referring to FIG. 16, an alternative induction-based drive mechanism 100 can actually take advantage of eddy currents. By alternatively energizing pairs of coils 102, 104 and 106, 108, a large magnetic shift can be generated in the armature 110, which can be made from a superconductor or a lightweight conductive material such as aluminum, beryllium, or lithium. Generally, the field shift will generate an eddy current in the conductor which may produce a force in the direction of field motion. The armature may require cooling to remove heat if it is operated with large eddy currents. In the case of a superconductor, cooling will not be needed as a result of power dissipation, but may be required to maintain a superconductive state. The armature may also be modified to take advantage of the Meisner effect.

The present invention can achieve a high degree of rapidity in measuring spectra either by the use of a reaction drive mechanism, or tilting, translation or precession of a plane mirror, or both together. Rapid oscillating motion is made possible and convenient. One advantage of this invention is that it can measure many spectra very rapidly. This rapid acquisition of spectra has particular applicability to research problems, environmental monitoring, process control and quality control. The present invention also advances the art of interferometry and as such, has important applications in metrology, optical correlation, and physics research.

The principles described in this application can be used in connection with the principles described in copending provisional applications entitled DEPTH-RESOLVED INFRARED SPECTROSCOPIC IMAGING AND SPECTROSCOPY, Ser. No. 60/091,602 and SPECTROMETRY EMPLOYING MIRROR ARRAYS, Ser. No. 60/091,641, both filed Jul. 2 1998 and herein incorporated by reference, as well as an application entitled HIGH-THROUGHPUT INFRARED SPECTROSCOPY, Ser. No.

60/092,769, filed on the same day as the present application, which is also herein incorporated by reference.

The principles, embodiments and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously considered. Numerous variations and changes can be made to the foregoing illustrative embodiments without departing from the scope and spirit of the present invention.

What is claimed is:

1. A spectrometer, comprising:

an actuator assembly, a mobile mirror assembly responsive to the actuator assembly and having a reflective surface, a balancing element responsive to the mobile mirror assembly, the mobile mirror assembly and the balancing element forming parts of a mechanical system that defines a resonant frequency, and an actuator assembly driver having an output frequency substantially tuned to the resonant frequency defined by the mechanical system that includes the mobile mirror assembly and the balancing element;

wherein the balancing element is an electrical element.

2. The spectrometer of claim 1 wherein the actuator assembly includes a super-conducting coil.

3. A spectrometer, comprising:

an actuator assembly, a mobile mirror assembly responsive to the actuator assembly and having a reflective surface, a balancing element responsive to the mobile mirror assembly, the mobile mirror assembly and the balancing element forming parts of a mechanical system that defines a resonant frequency, and an actuator assembly driver having an output frequency substantially tuned to the resonant frequency defined by the mechanical system that includes the mobile mirror assembly and the balancing element;

wherein the actuator assembly is fluid-driven.

4. A spectrometer, comprising:

an actuator assembly, a mobile mirror assembly responsive to the actuator assembly and having a reflective surface, a balancing element responsive to the mobile mirror assembly, the mobile mirror assembly and the balancing element forming parts of a mechanical system that defines a resonant frequency, and an actuator assembly driver having an output frequency substantially tuned to the resonant frequency defined by the mechanical system that includes the mobile mirror assembly and the balancing element;

wherein the actuator assembly includes a rotational actuator and further including at least one eccentrically weighted rotating element.

5. A spectrometer, comprising:

an actuator assembly, a mobile mirror assembly responsive to the actuator assembly and having a reflective surface, a balancing element responsive to the mobile mirror assembly, the mobile mirror assembly and the balancing element forming parts of a mechanical system that defines a resonant frequency, and an actuator assembly driver having an output frequency substantially tuned to the resonant frequency defined by the mechanical system that includes the mobile mirror assembly and the balancing element;

wherein the actuator assembly includes a rotational actuator assembly and further including a rotating crankshaft.

6. A spectrometer, comprising:

an actuator assembly, a mobile mirror assembly responsive to the actuator assembly and having a reflective surface, a balancing element responsive to the mobile mirror assembly, the mobile mirror assembly and the balancing element forming parts of a mechanical system that defines a resonant frequency, and an actuator assembly driver having an output frequency substantially tuned to the resonant frequency defined by the mechanical system that includes the mobile mirror assembly and the balancing element;

wherein the spectrometer includes a Michelson interferometer.

7. A spectrometer, comprising:

an actuator assembly, a mobile mirror assembly responsive to the actuator assembly and having a reflective surface, a balancing element responsive to the mobile mirror assembly, the mobile mirror assembly and the balancing element forming parts of a mechanical system that defines a resonant frequency, and an actuator assembly driver having an output frequency substantially tuned to the resonant frequency defined by the mechanical system that includes the mobile mirror assembly and the balancing element;

wherein the actuator is an induction-based actuator that employs eddy current as a motive force.

8. A spectrometer, comprising:

an actuator assembly, a mobile mirror assembly responsive to the actuator assembly, a balancing element responsive to the mobile mirror assembly, and a suspension mechanism operatively connected between the mobile mirror assembly, the balancing element and an optical support element in a relative position that isolates substantially all forces arising out of the actuation by the actuator assembly of the mobile mirror assembly and the balancing element;

wherein the suspension element includes a multi-part leaf spring formed from a flat sheet.

9. A spectrometer, comprising:

an actuator assembly, a mobile mirror assembly responsive to the actuator assembly, a balancing element responsive to the mobile mirror assembly, and a suspension mechanism operatively connected between the mobile mirror assembly, the balancing element and an optical support element in a relative position that isolates substantially all forces arising out of the actuation by the actuator assembly of the mobile mirror assembly and the balancing element;

wherein the suspension element includes a plurality of multi-part leaf springs formed from one or more flat sheets.

10. A spectrometer, comprising:

an actuator assembly, a mobile mirror assembly responsive to the actuator assembly, a balancing element responsive to the mobile mirror assembly, and a suspension mechanism operatively connected between the mobile mirror assembly, the balancing element and an optical support element in a relative position that isolates substantially all forces arising out of the actuation by the actuator assembly of the mobile mirror assembly and the balancing element;

wherein the balancing element is an electrical element.

11. A spectrometer, comprising:

an actuator assembly, a mobile mirror assembly responsive to the actuator assembly, a balancing element responsive to the mobile mirror assembly, and a suspension mechanism operatively connected between the mobile mirror assembly, the balancing element and an optical support element in a relative position that isolates substantially all forces arising out of the actuation by the actuator assembly of the mobile mirror assembly and the balancing element;

wherein the actuator assembly includes a superconducting coil.

12. A spectrometer, comprising:

an actuator assembly, a mobile mirror assembly responsive to the actuator assembly, a balancing element responsive to the mobile mirror assembly, and a suspension mechanism operatively connected between the mobile mirror assembly, the balancing element and an optical support element in a relative position that isolates substantially all forces arising out of the actuation by the actuator assembly of the mobile mirror assembly and the balancing element;

wherein the actuator assembly is fluid-driven.

13. A spectrometer, comprising:

an actuator assembly, a mobile mirror assembly responsive to the actuator assembly, a balancing element responsive to the mobile mirror assembly, and a suspension mechanism operatively connected between the mobile mirror assembly, the balancing element and an optical support element in a relative position that isolates substantially all forces arising out of the actuation by the actuator assembly of the mobile mirror assembly and the balancing element;

wherein the actuator assembly includes a rotational actuator and further including at least one eccentrically weighted rotating element.

14. A spectrometer, comprising:

an actuator assembly, a mobile mirror assembly responsive to the actuator assembly, a balancing element responsive to the mobile mirror assembly, and a suspension mechanism operatively connected between the mobile mirror assembly, the balancing element and an optical support element in a relative position that isolates substantially all forces arising out of the actuation by the actuator assembly of the mobile mirror assembly and the balancing element wherein the actuator assembly includes a rotational actuator assembly and further including a rotating crankshaft.

15. A spectrometer, comprising:

an actuator assembly, a mobile mirror assembly responsive to the actuator assembly, a balancing element responsive to the mobile mirror assembly, and a suspension mechanism operatively connected between the mobile mirror assembly, the balancing element and an optical support element in a relative position that isolates substantially all forces arising out of the actuation by the actuator assembly of the mobile mirror assembly and the balancing element;

wherein the actuator assembly is an induction-based actuator assembly that employs eddy current as a motive force.

16. A spectrometer, comprising:

an actuator assembly, a mobile mirror assembly responsive to the actuator assembly, a balancing element responsive to the mobile mirror assembly, and a suspension mechanism operatively connected between the mobile mirror assembly, the balancing element and an optical support element in a relative position that isolates substantially all forces arising out of the actuation by the actuator assembly of the mobile mirror assembly and the balancing element;

wherein the mirror assembly is operative to pivot about a line parallel to or coincident with the reflective surface.

17. A spectrometer, comprising:

an actuator assembly, a mobile mirror assembly responsive to the actuator assembly, a balancing element responsive to the mobile mirror assembly, and a suspension mechanism operatively connected between the mobile mirror assembly, the balancing element and an optical support element in a relative position that isolates substantially all forces arising out of the actuation by the actuator assembly of the mobile mirror assembly and the balancing element;

wherein the reflective surface forms part of a Michelson interferometer.

18. A spectrometer, comprising:

an actuator assembly, a mobile mirror assembly responsive to the actuator assembly and having a reflective surface, a balancing element responsive to the mobile mirror assembly, the mobile mirror assembly and the balancing element forming parts of a mechanical system that defines a resonant frequency, and an actuator assembly driver having an output frequency substantially tuned to the resonant frequency defined by the mechanical system that includes the mobile mirror assembly and the balancing element;

wherein the mirror assembly includes a mirror element, a support web, and a connective element between the mirror element and the support web.

19. The apparatus of claim 18 further including a tensioning structure attached to the web.

20. A spectrometer, comprising:

an actuator assembly, a mobile mirror assembly responsive to the actuator assembly and having a reflective surface, a balancing element responsive to the mobile mirror assembly, the mobile mirror assembly and the balancing element forming parts of a mechanical system that defines a resonant frequency, and an actuator assembly driver having an output frequency substantially tuned to the resonant frequency defined by the mechanical system that includes the mobile mirror assembly and the balancing element;

wherein the mirror assembly includes a mirror element, a support web, and a connective element between the mirror element and the support web.

21. The apparatus of claim 20 further including a tensioning structure attached to the web.

* * * * *

UNITED STATES PATENT AND TRADEMARK OFFICE
CERTIFICATE OF CORRECTION

PATENT NO. : 5,949,544  
DATED : September 7, 1999  
INVENTOR(S) : Manning

Page 1 of 1

It is certified that error appears in the above-identified patent and that said Letters Patent is hereby corrected as shown below:

Column 1,
The title should read -- "METHODS AND APPARATUS FOR PERFORMING SPECTROMETRY" --;

Signed and Sealed this

Eighth Day of January, 2002

Attest:

JAMES E. ROGAN
Attesting Officer   Director of the United States Patent and Trademark Office